(12) United States Patent
Lee et al.

(10) Patent No.: US 7,885,273 B2
(45) Date of Patent: Feb. 8, 2011

(54) METHOD AND SYSTEM FOR CONVERTING SERVICE TYPES OF DEVICES CONNECTED TO CONTROL GATEWAY

(75) Inventors: Kuen-Ming Lee, Pingtung County (TW); Yu-Shiang Sheng, Taipei (TW); Wen-Wei Lin, Tainan County (TW); Yung-Shun Huang, Tainan (TW); Min-Chiao Wang, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 698 days.

(21) Appl. No.: 11/308,564

(22) Filed: Apr. 7, 2006

(65) Prior Publication Data

US 2007/0147396 A1 Jun. 28, 2007

(30) Foreign Application Priority Data

Dec. 22, 2005 (TW) .............................. 94145773 A

(51) Int. Cl.
*H04L 12/28* (2006.01)
*H04J 3/16* (2006.01)
*G06F 15/16* (2006.01)
*G06F 15/177* (2006.01)
*G06F 3/00* (2006.01)

(52) U.S. Cl. ................. 370/401; 370/465; 709/203; 709/220; 709/250; 719/311

(58) Field of Classification Search ................. 370/401, 370/465–467; 719/311; 709/220, 203, 250
See application file for complete search history.

(56) References Cited

U.S. PATENT DOCUMENTS

| 6,504,852 B1 | 1/2003 | Couturier et al. |
| 7,392,304 B2 * | 6/2008 | Kang et al. ................. 709/223 |
| 7,437,432 B2 * | 10/2008 | Bodin et al. ................. 709/220 |
| 2001/0034754 A1 * | 10/2001 | Elwahab et al. ............. 709/201 |
| 2004/0028031 A1 | 2/2004 | Valin et al. |
| 2004/0139177 A1 * | 7/2004 | Yook ........................... 709/220 |
| 2004/0267950 A1 | 12/2004 | Praefcke et al. ............. 709/231 |
| 2005/0015462 A1 * | 1/2005 | Lee et al. .................... 709/217 |
| 2006/0041924 A1 * | 2/2006 | Bushmitch et al. .......... 725/132 |

(Continued)

FOREIGN PATENT DOCUMENTS

JP 2000286897 10/2000

(Continued)

*Primary Examiner*—Alpus H Hsu
*Assistant Examiner*—Jeremy Costin
(74) *Attorney, Agent, or Firm*—Jianq Chyun IP Office

(57) ABSTRACT

A method and a system for converting the service types of the devices connected to a control gateway are provided. The system includes a server, an open platform, a control gateway and devices connected to the control gateway. Wherein, the device possesses device description information and is operated in a first device service type; the control gateway is electrically coupled between the open platform and the device, holds or obtains the device description information of the device and delivers the device description information to the open platform; the server provides a plurality of device service contents. The open platform further according to the device description information obtains the device service content corresponding to the device from the server and registers the device service content in the open platform.

9 Claims, 3 Drawing Sheets

U.S. PATENT DOCUMENTS

| | | | |
|---|---|---|---|
| 2007/0083618 A1* | 4/2007 | Kim | 709/218 |
| 2008/0069121 A1* | 3/2008 | Adamson et al. | 370/401 |
| 2008/0095179 A1* | 4/2008 | Lee et al. | 370/401 |
| 2008/0205419 A1* | 8/2008 | Shin et al. | 370/401 |

FOREIGN PATENT DOCUMENTS

| | | |
|---|---|---|
| TW | 200401545 | 1/2004 |
| TW | 200405715 | 4/2004 |
| TW | 1239176 | 9/2005 |

* cited by examiner

METHOD AND SYSTEM FOR CONVERTING SERVICE TYPES OF DEVICES CONNECTED TO CONTROL GATEWAY

CROSS-REFERENCE TO RELATED APPLICATION

This application claims the priority benefit of Taiwan application serial no. 94145773, filed on Dec. 22, 2005. All disclosure of the Taiwan application is incorporated herein by reference.

BACKGROUND OF THE INVENTION

1. Field of Invention

The present invention relates to a method and a system for converting the service type of an open platform, and particularly to a method and a system for converting the service types of the devices connected to a control gateway.

2. Description of the Related Art

Along with the digital home trend and Internet emerging growth, a variety of residential network protocols (RNPs) and agency platforms comes out too. The so-called "heterogeneous network integration" becomes a new focus and big challenge for the development of the digital home. Several years ago, Open Services Gateway Initiative Alliance (OSGi Alliance) provided an open service platform, which is one of the solutions just reflecting such demand.

In the current OSGi specification, only two connection modes are defined. One of the connection modes is the Device Access specification defined in chapter 11 thereof, which defines how a driver corresponding to a physical device connected to an open service residential gateway (open service RG) is downloaded. The other connection mode is the connection through network defined in chapter 25 of the OSGi specification, which includes such as: converting an OSGi service into a standard Universal Plug and Play (UPnP) device service; providing the converted OSGi service to internal multi-service bundles or external UPnP control points for use.

As a matter of fact, not all devices of a digital home are connected to the residential gateway (RG); moreover, not all devices are powerful to handle Internet access communication. As an alternative solution to meet such situation, however, a usually available device connection mode is to connect some plain devices with simple functions to a function-powerful control gateway, while the open platform of an RG would indirectly control the plain devices in a sub-hierarchy and linked thereto through the control gateway. A home security layout is an example, wherein simple sensors are connected to a function-powerful master controller to achieve the integration control goal; a so-called LonWorks network framework commonly available on the market is another example, wherein LonWorks standard devices are connected to a LonWorks server for indirectly controlling the LonWorks standard devices through the LonWorks server. In the framework, an open platform is unable to directly communicate with the devices connected to the control gateway, but it can control the connected devices through the control gateway. So-called LonWorks herein is an acronym of Local Operating Networks and is a networking platform, created by German company of Echelon.

In terms of the above-mentioned framework in connection to a plurality of devices under a control gateway, if the framework is implemented according to the OSGi Device Access specification, the control gateway and all the devices thereunder are considered as a large set of virtual devices. Then, the drivers of the set of virtual devices are downloaded, wherein the downloaded drivers should include the control gateway driver and a set of the individual drivers corresponding to all the devices connected to the control gateway. According to such a scheme, to newly add or remove a device connected to the control gateway, the previously downloaded drivers are not applicable any more. Instead, it needs to download a driver set corresponding to the new set of virtual devices again.

In other words, according to the above-described scheme, the control gateway and all the devices thereunder are considered as a unique and stiff device unable to be changed. Obviously, it is not a feasible solution that all original drivers must be deleted and a new packet of drivers must be downloaded again for the sake of adding or removing a device. In addition, the job to download a packet of drivers is extremely time-consuming and prone to be disconnected. Consequently, the above-described scheme is apparently very ineffective.

In terms of the UPnP device service standard established by the OSGi specification $3^{rd}$ ver., only an interface is provided in the standard for those non-UPnP devices to be converted into the UPnP standard device service so as to serve the internal multi-service bundles or the external UPnP control points for use or control; besides, the standard also provides a mechanism of UPnP base drivers, by which the UPnP device service of an UPnP device can be automatically registered on the service registry of an open service RG (residential gateway). For the above-described framework where a plurality of devices is connected to a control gateway underneath, however, since an open platform is unable to directly communicate with the devices connected to the control gateway, there is no way to provide those devices with a mechanism of converting the devices into various device services and downloading the corresponding device services. Thus, the UPnP device service standard established by the $3^{rd}$ version of OSGi specification is unable to solve the problem associated with the framework where a plurality of devices is connected to a control gateway.

Currently, in the related available technical papers, the discussed issues are mostly focused on how to integrate an communication protocol or an agency software with non-OSGi standard into an open service platform. For example, the paper "Service-based Access to Distributed Embedded Devices through the Open Service Gateway" describes that how devices of HAVi (home audio video interoperability) on CAN (control area network) are re-registered on the service registry of an open service RG (residential gateway) after packaging the devices into a control service through two mechanisms of the OSGi Device Access standard and JNI (java native interface) for achieving the integration and control goal. Unfortunately, so far there has been no paper to discuss how to integrate a device controlled through a control gateway into an open service platform yet.

The other related papers are involved in discussing the issue that how to convert one communication protocol or standard into another one. For example, the paper "Device and Service Discovery in Home Network with OSGi" discusses a mutual converting mechanism between Jini standard and OSGi standard or between UPnP and OSGi standard. However, the proposed method is limited to converting of Jini and UPnP device services; besides, the physical device itself must be capable of device discovery and control. Hence, the above-mentioned papers do not give a solution in practice for the devices which are unable to be directly controlled and require a control gateway to control them.

Except for the above-mentioned papers, most of the related patents focus on how to take advantage of a corresponding mechanism generated on an open service platform to obtain the function of controlling the devices originally controlled by other standard agency protocols. US Patent Application No. 20040267950 is an example of the sort of patents. In addition, some other patents focus on how to take advantage of other more popular or universal means and schemes to achieve the goal of controlling devices, for example, the US Patent Application No. 20010034754. Nevertheless, the above-mentioned patents still do not touch the issue how to integrate devices connected to a control gateway into an open service platform.

SUMMARY OF THE INVENTION

Based on the above described, an object of the present invention is to provide a method and a system for converting the service types of the devices connected to a control gateway. By using the method and the system, control gateway base drivers are established on an open platform and the drivers would, in assistance of a mechanism of downloading and providing a device service contents corresponding to the device, convert a device service corresponding to the device that connected to the control gateway but unable to be directly controlled into a device service in other types so as to achieve the goal of integration and control.

Accordingly, the present invention provides a method for converting a service type of a device connected to a control gateway, in a system using an open platform, and the control gateway can directly communicate with the device. Wherein, in the open platform, a control gateway base driver module corresponding to the control gateway is provided, followed by starting up the control gateway base driver module so as to deliver the device description information corresponding to the devices and provided by the control gateway to the open platform. According to the received device description information, the open platform obtains device service contents corresponding to the above-described devices and registers the same, so that the device service contents are informed by a system which adopts a second device service type. When the system adopting the second device service type uses an original instruction to specify using the device service contents, the open platform converts the original instruction into an instruction capable of communicating with the control gateway, followed by delivering the converted instruction to the control gateway. In the end, the control gateway is able to control the devices connected thereto for operations according to the converted instruction.

In an embodiment of the present invention, a specific chip serial number in a device can serve as the device description information. Alternatively, the device description information can be made by combining device function group, sequential id, and other information. Anyway, the device description information of each device must keep uniqueness.

The present invention further provides a system for converting service types of devices connected to a control gateway, which includes a server, an open platform, a control gateway and devices connected to the control gateway. Wherein, the devices possess device description information and are operated in a first device service type; the control gateway is electrically connected between the open platform and the devices for obtaining the device description information of the devices and delivering the device description information to the open platform; the server provides a plurality of device service contents. Furthermore, the open platform would, according to the device description information, obtain the device service contents corresponding to the devices from the server and register the same, so as to inform the system which adopts the second device service type of the device service contents. When the system adopting the second device service type takes an original instruction to specify using the device service contents, the open platform would convert the original instruction into an instruction capable of communicating with the control gateway and then deliver the converted instruction to the control gateway for controlling the above-described device.

In an embodiment of the present invention, the control gateway base driver in the open platform includes a service proxy module and an instruction management module. The service proxy module comprises the device service contents based on the second device service type and is in charge of converting jobs between the instructions or information based on the first device service type and the instructions or information based on the second device service type. The instruction management module includes a proxy installation unit and a processing unit. The processing unit obtains the device description information from control gateway and check if there are newly-added devices. According to every newly-added device description information, the proxy installation unit would download the corresponding device service contents complied with the second device service type from the server or an element download center, and then install and register the downloaded device service contents in the open platform. The processing unit would re-convert the instructions or information in the first device service type converted by the service proxy module into an instruction or information in a gateway protocol format able to communicate with the control gateway, and deliver the instruction or information to the control gateway; meanwhile, the processing unit would convert the instruction or information complied with a gateway protocol format received from the control gateway into an instruction or information complied with the first device service type, followed by delivering the instruction or information to the proxy installation unit or the service proxy module.

The present invention further provides an open platform, which is electrically connected to the control gateway while the control gateway is further electrically connected to a device operated in the first device service type. The control gateway base driver in the open platform includes a service proxy module and an instruction management module. The service proxy module comprises the device service contents based on the second device service type and is in charge of converting jobs between the instructions or information based on the first device service type and the instructions or information based on the second device service type. The instruction management module includes a proxy installation unit and a processing unit. The proxy installation unit would download the corresponding device service contents complied with the second device service type from the server or an element download center, and then install and register the downloaded device service contents in the open platform. The service proxy module itself converts the original instructions or information generated after receiving the same and based on the second device service type into the instructions or information complied with the first device service type. Afterwards, the processing unit converts the instructions or information compiled with the first device service type into the instructions or information complied with the control gateway protocol and understandable by the control gateway, followed by delivering the instructions or information in the control gateway protocol to the control gateway for controlling devices. In addition, the processing unit converts the instructions or information received from the control gateway into the instructions or information complied with the first device service type, followed by extracting the meaningful information contents, and then delivering the extracted information contents to the proxy installation unit or the service proxy module.

In summary, the present invention uses other service types to register the device service provided by the devices which are unable to be directly controlled on the open platform, such that the control points in other control types are able to sense the presence of the devices. As a control point sends out control instructions, the open platform is able to convert the instructions into the instructions based on the control gateway protocol through the control gateway base driver. Therefore, the present invention is capable of providing the devices which are connected to the control gateway but unable to be directly controlled with converted device services in other types, so as to achieve the goal of integration and control.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
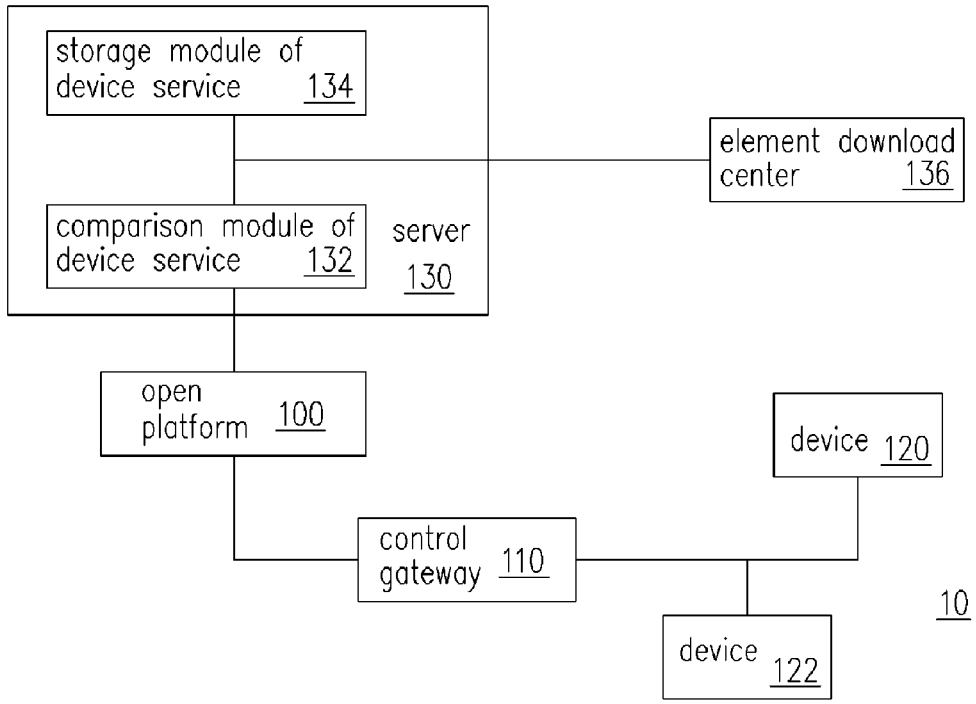
FIG. 1 is a block diagram of a system for converting the device service type of the device connected to a control gateway according to an embodiment of the present invention.

FIG. 1 is a block diagram of a system for converting the device service type of the device connected to a control gateway according to an embodiment of the present invention. Referring to FIG. 1, a system 10 in the embodiment includes an open platform 100 electrically connected to a control gateway 110 thereof and devices 120 and 122 of the control gateway 110, a server 130 and an element download center 136 which the server can access. In the embodiment, to make the devices 120 and 122 run normally, the manufacturer thereof should provide the element download center 136 or the server 130 with the corresponding device service contents for use. In the server 130, generally there are a storage module of device service 134 for storing the device service contents and a comparison module of device item 132 for comparing the information transmitted from the open platform 100 to decide the storage position of the device service contents required by the open platform 100 and to further decide whether or not to obtain the device service contents from the storage module of device service 134 or the element download center 136.

In addition, since the devices 120 and 122 are unable to be directly controlled by the open platform 100, hence all jobs, no matter the job to deliver instructions to the devices 120 and 122 or the job to obtain information from the devices 120 and 122, must be done through the control gateway 110, which serves as an instruction/information transfer center between the open platform 100 and the devices 120 and 122.

Figure 2:
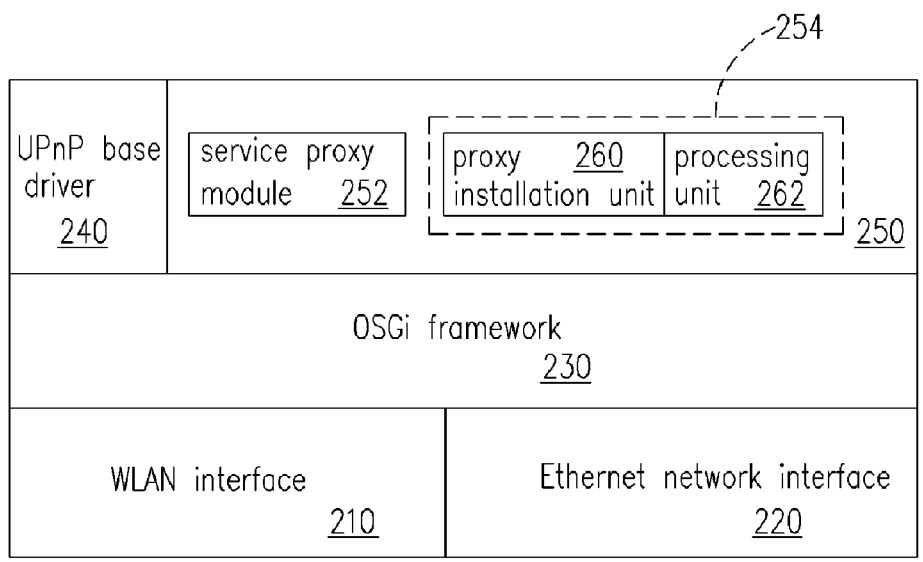
FIG. 2 is a software architecture block diagram of an open platform according to an embodiment of the present invention.

FIG. 2 is a software architecture block diagram of an open platform according to an embodiment of the present invention. Referring to FIG. 2, in order to clearly explain the present invention with universality, two common device service types of LonWoks (termed as first device service type hereinafter) and UPnP (termed as second device service type hereinafter), and the conversion between the LonWoks and the UPnP are used for exemplary purpose. In the embodiment, though the open platform 100 is comprised of an OSGi framework 230 as the center and other software modules, however, it is one of application packages of the open platform 100 only. Similarly, the wireless local area network interface (WLAN interface) 210, the Ethernet network interface 220 and the UPnP base driver 240 mentioned in the present invention are considered as one of software the open platform 100 can choose. The present invention does not limit to the above-mentioned software.

In the embodiment, the open platform 100 provides a control gateway base driver module 250 corresponding to the control gateway 110. It is common for those skilled in the art that all functions of the control gateway base driver module 250 can be implemented by software only, a combination of software and hardware, or a hardware structure. The control gateway base driver module 250 herein includes a service proxy module 252 and an instruction management module 254. The instruction management module 254 further includes a proxy installation unit 260 and a processing unit 262. Wherein, the service proxy module 252 corresponds to the device service contents (herein, those are device 120 and device 122) connected to the control gateway 110. Therefore, for a case with a service proxy module 252 will comprises plurality of devices connected to the control gateway 110, a plurality of corresponding device service contents must be available.

In more detail, the service proxy module 252 comprises plurality of device service contents based on device service types, for example, the device service in UPnP type (i.e. the second device service type), and is in charge of converting jobs between instructions or information in the first device service type and instructions or information in the second device service type. The proxy installation unit 260 would, according to the device service contents to be obtained, download the device service contents from the server or the element download center, followed by installing and registering the downloaded contents to the open platform 100. The original UPnP device service type-based instruction or information (termed as original instruction or information hereinafter) is converted by the service proxy module 252 into the one in format of the first device service type, then the converted instruction or information is delivered to the processing unit 262, by which the received instruction or information is further converted into the instruction or information complied with the control gateway protocol, followed by sending the instruction or information to the control gateway 110.

Note that the communication between the control gateway 110 and the open platform 100 is certainly different from the one between the devices 120 and 122 and the control gateway 110, thus, the processing unit 262 has to first convert the instructions in the first device service type for controlling the devices 120 or 122 into the instructions or information understood by the control gateway 110 and complied with the control gateway protocol. Then, the converted instructions or information are transmitted to the control gateway 110 through the control gateway protocol for controlling the devices 120 or 122. Besides, the processing unit 262 is also in charge of receiving the instructions or information received from the control gateway 110 and extracting the meaningful information contents, followed by delivering the extracted information contents to the proxy installation unit or the service proxy module.

Figure 3:
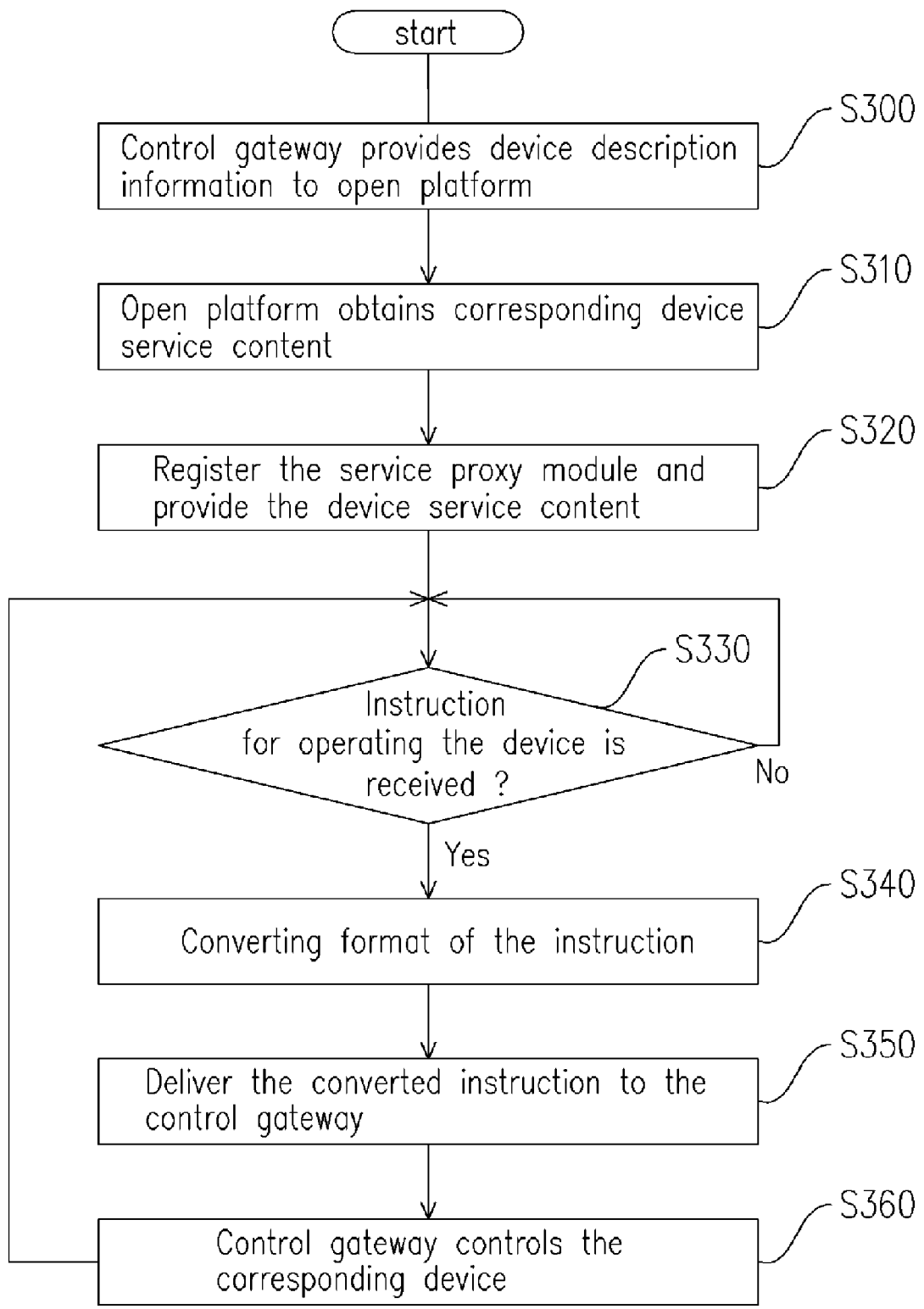
FIG. 3 is an implementation step flowchart of a method for converting the device service type of the device connected to a control gateway according to an embodiment of the present invention.

Continuing to FIG. 3, it is an implementation step flowchart of a method for converting the device service type of the device connected to a control gateway according to an embodiment of the present invention. To clearly explain the present invention, the referenced elements are taken from FIG. 1 and FIG. 2.

First, since the open platform 100 is unable to directly communicate with the device 120 or 122 connected to the control gateway 110, hence, the open platform 100 must collect the related information of the connected devices through the control gateway 110. In the embodiment, whenever initially staring up or adding a device (at the point, no service proxy module 252 exists), the control gateway base driver module 250 established on the open platform 100 and aiming the control gateway 110 as the driving target must be capable of communicating with the control gateway 110. Next, the control gateway base driver module 250 is able to inquire of the control gateway 110 about the connected device number and the device description information of each device. Wherein, the device description information can be a specific chip serial number (for example, a serial number of a Neuron chip in a LonWoks standard device), or a parameter group within the parameter domain required by a device, or a function group with the function domain required by a device. It is preferred that the selection manner of the above-described device description information should make the device description information of same devices uniqueness.

Since only the control gateway 110 is able to communicate with the connected devices 120 and 122, the control gateway 110 must be responsible for sending back the related information of the device thereunder to the control gateway base driver module 250. Thus, as the control gateway 110 receives an inquiry from the control gateway base driver module 250, the control gateway 110 would reply the information of all the connected devices 120 and 122, including device ID (identification) information, so that the control gateway base driver module 250 knows how many devices are connected to the control gateway 110 underneath and what kinds of devices they are. (step S300).

After the control gateway base driver module 250 receives the information sent back by the control gateway 110, the information would be analyzed, and the provided device description information including the device ID is extracted. Further, by means of the extracted device description information and the device services in different types required by the open platform 100, the control gateway base driver module 250 inquires the server 130 to provide the corresponding downloadable device services. If the inquired device description information possesses the required device services for downloading, the server 130 would provides the control gateway base driver module 250 with the download element or the download position. Otherwise, i.e. if the inquired device description information is not available, or the required device services in different types do not exist, the server 130 would reply the control gateway base driver module 250 that the asked operation is unable to be accomplished. If the device services inquired and asked by the control gateway base driver module 250 exist, the server 130 would deliver the corresponding information to the control gateway base driver module 250 (step S310). Wherein, the information can be provided by either the server 130 or the element download center 136.

Finally, after the open platform 100 had downloaded the corresponding device service content, the control gateway base driver module 250 would register the device service contents in the service proxy module 252, corresponding to the device to a service registry of the open platform 100 and generate a corresponding device service object (step S320). As a result, if other multi-service bundles on the platform or the external control devices sends out an operation instruction intending to operate the device (step S330), the operation instruction would first arrive at the service proxy module 252 of the device. Then, the service proxy module 252 would convert the operation instruction in the second device service type into an operation instruction in the first device service type, following by delivering it to the processing unit 262. As described above, the processing unit 262 converts the instructions or information complied with the first device service type into instructions or information complied with the control gateway protocol (step S340). Then, the converted instructions would be delivered to the control gateway 110 (step S350), so that the control gateway 110 is able to control the corresponding device (step S360). At the point, the present invention enables the control points in various device service types to use or control the device services of the device, and the unconvertible problem with a conventional method can be solved.

Figure 4:
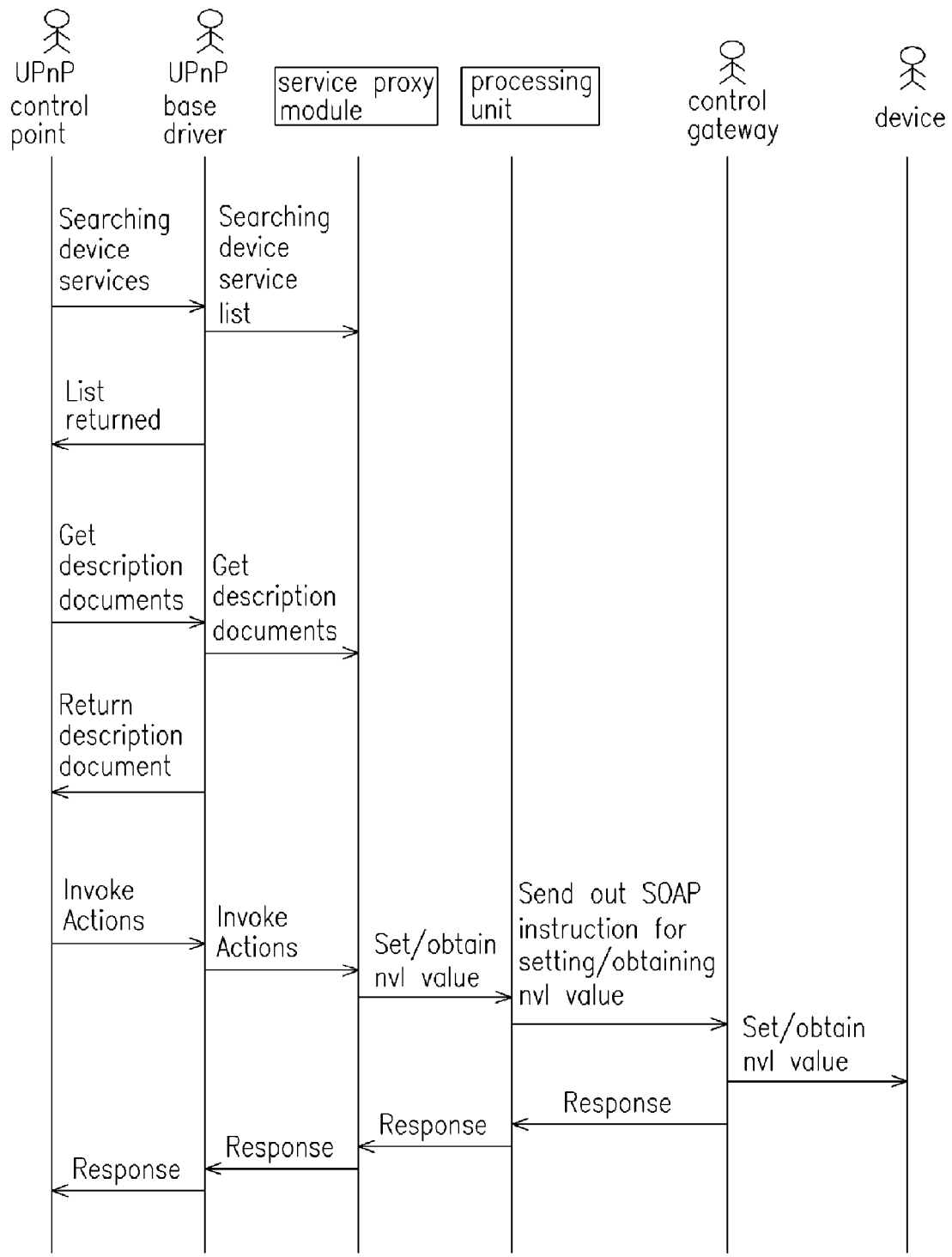
FIG. 4 is a signal transmission flowchart for controlling different service device type according to an embodiment of the present invention.

Continuing to FIG. 4, it is a signal transmission flowchart for controlling different service device type according to an embodiment of the present invention. In the embodiment, the above-described control gateway is a LonWorks server, which communicates with outside by means of SOAP (simple object access protocol; that is, the above-mentioned "protocol complied with the control gateway" or the "control gateway protocol" in the embodiment). Therefore, if an UPnP control point wants to control a connected device under the LonWorks server, a signal searching device services of various devices is sent out from the UPnP control point. Once the UPnP base driver in the open platform receives the searching signal, all device services registered in the open platform can be obtained and a list thereof would be returned to the UPnP control point.

Note that the SOAP signal sent by the LonWorks server contains some control and state-variable information (i.e. in the first device service type) relating to NVI (network variable input) and NVO (network variable output) only, while the contents in UPnP standard type (i.e. in the second device service type) is comprised of an UPnP service description and an UPnP device description, hence the SOAP format signal sent out by the LonWorks server is unable to provide the information required by the corresponding UPnP standard type. To solve the problem, the present invention further adopts Neuron ID to represent the serial number information of the LonWorks standard device. Neuron chips are designed by German company Echelon and manufactured by Japan company Toshiba, wherein the Neuron name was chosen to point out the similarities between proper network control implementation and the human brain. Neuron chip's ID is marked down on every Neuron chip used in any LonWorks standard device and the ID is a unique and unrepeatable number worldwide. By means of the uniqueness of the Neuron ID, a naming rule is established and the Neuron ID is bound into the related device description information. According to the framework, the related manufacturers are requested to use Neuron ID as a keyword for providing the device service content of the corresponding device to favor the download job and use later on.

Once receiving a service list, the UPnP control point would further get a description document regarding device service contents (stored in the service proxy module) from the service registry of the open platform through the UPnP base driver. After getting the description document, the UPnP control point can invoke actions based on the service affordable by the device. After the invoked actions are delivered by the UPnP base driver to the service proxy module, they are converted by the service proxy module into values of NVL (network variable local) instruction, which are needed to be set for controlling the device; or the NVL values are just simply obtained from the device by sending out an instruction. Afterwards, the processing unit would, according to the set NVL values or the NVL values to be obtained, send out a corresponding SOAP instruction to the control gateway. The device connected to the control gateway, according to the instruction, performs the corresponding operations; after accomplishing the operations, the result is fed back to the UPnP control point. In this way, the UPnP control point is able to control the LonWorks standard devices.

In summary, the present invention uses other service types to register the device services provided by devices which are unable to be directly controlled on the open platform, so that the control point in other service types is able to know the presence of the devices. As a control point sends out instructions, the open platform is also able to convert the instructions into instructions based on the control gateway protocol. Consequently, the present invention is capable of providing the devices connected to the control gateway but unable to be directly controlled with converted device services in other types, so as to achieve the goal of integration and control.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A method for converting a service type of a device connected to a control gateway, in a system using an open platform, and the control gateway can directly communicate with the device, wherein the device is operated in a first device service type; the method comprising:

providing a control gateway base driver module in the open platform corresponding to the control gateway;

coupling the open platform, the control gateway and the device, wherein the control gateway controls the device, the open platform communicate with the control gateway but not directly to the device;

starting up the control gateway base driver module for the control gateway to provide device description information corresponding to the device connected to control gateway to the open platform;

according to the device description information, the open platform obtaining at least one device service content corresponding to the device;

the open platform converting the device service content to a second device type so as for a system which adopts the second device service type to know the device service content;

as the system adopting a second device service type takes an original instruction to specify using the device service content, the open platform converting the original instruction into an instruction able to communicate with the control gateway;

the open platform sending out the converted instruction in a type compiled with a control gateway protocol to the control gateway; and according to the converted instruction, the control gateway controlling the device operations wherein the system adopting the second device service type uses the first device service type to communicate with the device via the control gateway by a same control gateway protocol, the control gateway does not convert the control gateway protocol.

2. The method for converting a service type of a device connected to a control gateway as recited in claim 1, wherein the step for the open platform according to the device description information to obtain the device service content corresponding to the device comprises:

judging whether or not the device service content exists in the open platform, wherein if no device service content exists, then:

the open platform providing the device description information to a server; and the server providing the device service content to the open platform.

3. The method for converting a service type of a device connected to a control gateway as recited in claim 2, wherein the step for the server to provide the device service content to the open platform comprises:

according to the device description information, the server finding out a storage module of device service content with a storage location or an element download center storing the device service content;

the server obtaining the device service content from itself or the element download center; and the server providing the device service content to the open platform.

4. The method for converting a service type of a device connected to a control gateway as recited in claim 1, wherein the device description information is a serial number of a specific chip of the device.

5. The method for converting a service type of a device connected to a control gateway as recited in claim 1, wherein the device description information is obtained by dividing parameters required by the device into groups and the device description information of identical devices feature uniqueness.

6. The method for converting a service type of a device connected to a control gateway as recited in claim 1, wherein the device description information is obtained by dividing device functions into groups and the device description information of identical devices feature uniqueness.

7. The method for converting a service type of a device connected to a control gateway as recited in claim 6, wherein the open platform comprises an open service platform using an OSGi specification.

8. A system for converting service type of a device connected to a control gateway, comprising:

a device, having a device description information and operated in a first device service type;

a control gateway, electrically coupled to the device and obtaining the device description information from the device;

a server, providing a plurality of device service contents; and an open platform, connected between the control gateway and the server but not directly to the device, the open platform having a control gateway base driver module corresponding to the control gateway for driving the control gateway, wherein the open platform obtains the device description information from the control gateway and according to the obtained device description information further obtains the device service contents corresponding to the device from the server; then the open platform converts the device service contents into a second device service type for the system using the second device service type to know the device service contents; and as the system using the second device service type takes an original instruction to specify using the device service contents, the original instruction is converted by the open platform into an instruction able to communicate with the control gateway; the converted instruction is then by a manner complied with a control gateway protocol transmitted to the control gateway for controlling the device, wherein the system adopting the second device service type uses the first device service type to communicate with the device via the control gateway by the same control gateway protocol, the control gateway does not convert the control gateway protocol.

9. The system for converting service type of a device connected to a control gateway as recited in claim 8, wherein the open platform comprises:

a service proxy module, comprising a device service content based on the second device service type and being responsible for converting between the instruction or information in the first device service type and the instruction or information in the second device service type; and an instruction management module, comprising:

a proxy installation unit, responsible for downloading the device service content with a manner complied with the second device service type from the server or an element download center, installing the downloaded device service content and registering the device service content in the open platform; and a processing unit, responsible for extracting meaningful information contents from the instruction or information received from the control gateway, converting the extracted information content into the one with the information format complied with the first device service type and delivering the converted information content to the service proxy module or the proxy installation unit; on the other hand, responsible for converting the instruction or information in the first device service type received from the service proxy module into the instruction or information in a format able to communicate with the control gateway for communication with the control gateway.

* * * * *